US008447669B2

(12) United States Patent
Antoo et al.

(10) Patent No.: US 8,447,669 B2
(45) Date of Patent: May 21, 2013

(54) SYSTEM AND METHOD FOR IMPLEMENTING FINANCIAL ASSISTANCE PROGRAMS

(75) Inventors: Nizam Antoo, San Carlos, CA (US); Todd J. Brockman, Kentfield, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

(21) Appl. No.: 12/229,760

(22) Filed: Aug. 26, 2008

(65) Prior Publication Data

US 2010/0057611 A1 Mar. 4, 2010

(51) Int. Cl.
 *G06Q 40/00* (2006.01)
(52) U.S. Cl.
 USPC .............................................. 705/35; 705/36
(58) Field of Classification Search ............... 705/10–44
 See application file for complete search history.

(56) References Cited

U.S. PATENT DOCUMENTS

| 5,536,045 | A  | * | 7/1996  | Adams .............................. 283/67 |
| 5,649,118 | A  | * | 7/1997  | Carlisle et al. ................... 705/41 |
| 7,356,505 | B2 |   | 4/2008  | March |
| 7,899,744 | B2 | * | 3/2011  | Bishop et al. ..................... 705/39 |
| 8,050,997 | B1 | * | 11/2011 | Nosek et al. ...................... 705/37 |
| 8,074,876 | B2 | * | 12/2011 | Foss et al. ...................... 235/380 |
| 8,249,965 | B2 | * | 8/2012  | Tumminaro ..................... 705/35 |
| 8,275,704 | B2 | * | 9/2012  | Bishop et al. .................... 705/39 |
| 8,346,659 | B1 | * | 1/2013  | Mohsenzadeh ................. 705/39 |
| 2005/0192895 | A1 |   | 9/2005  | Rogers et al. |

OTHER PUBLICATIONS

David Breitkopf, "ACS to Take Over Mich. WC Distribution Program", American Banker, New York, NY: Jul. 20, 2006, vol. 171, Issue 138, p. 6.*
Business Wire, "New York State Department of Labor Selects JPMorgan Chase to Provide New Banking Services for Unemployment Insurance Benefits; JPMorgan Chase Electronic Services to Help Speed Benefit Payments", Business Wire, New York, Aug. 4, 2006, p. 1.*
International Search Report from Corresponding International Application No. PCT/US09/54921, mailed Oct. 21, 2009.

* cited by examiner

*Primary Examiner* — Frantzy Poinvil
(74) *Attorney, Agent, or Firm* — Cooley LLP; Walter G. Hanchuk; Nathan W. Poulsen

(57) ABSTRACT

A system and method to provide food stamp benefits to recipients. The state agency responsible for distributing food stamp benefits to eligible recipients employs an issuer to produce consumer access devices for distribution to the recipients. The consumer access device is encoded with information enabling the food stamp recipients to purchase specified items from merchants. By imprinting the consumer access device with indicia identifying a commercial payment processing network and employing the commercial payment processing network to process the transactions, transaction funded by the food stamp program will appear to be credit or debit transactions personally funded by the food stamp recipient.

9 Claims, 3 Drawing Sheets

SYSTEM AND METHOD FOR IMPLEMENTING FINANCIAL ASSISTANCE PROGRAMS

FIELD OF THE DISCLOSURE

The present disclosure relates to systems and methods for implementing financial assistance programs and, more particularly, to systems and methods employing a commercial payment processing network when processing benefits provided under the financial assistance program.

BACKGROUND

Local, state and federal governments routinely fund and/or administer a wide variety of financial assistance programs. Such programs include, among others, food stamps, aid to dependent children, unemployment insurance, WIC and the like. While programs such as these provide financial assistance to those in need, the implementation thereof can have adverse effects on the recipients of the benefits distributed thereunder. Many people still view receiving government assistance as a stigma and are often embarrassed when others become aware of that fact, for example, when purchasing groceries using food stamps. While the ongoing transition from the use of paper coupons to electronic benefit transfer (EBT) cards has enabled food stamp recipients to make purchases much more discretely, the electronic readers and/or point of sale (POS) systems employed in such transactions process EBT cards differently than debit and credit cards. For example, when purchasing groceries using an EBT card, the person using the card is required to identify the purchase as an EBT transaction. As a result, those nearby learn that the person is on food stamps, again producing an embarrassing moment for those sensitive to the fact that they are on public assistance.

In addition, public assistance programs are often plagued by high administrative costs. Moreover, such administrative costs often spill over into the private sector. For example, it is generally acknowledged that participation in the food stamp program causes merchants to incur additional administration costs. As a result, merchants accepting food stamps typically receive financial compensation from the governmental entity administering the food stamp program, thereby reducing the financial resources available to assist those in need. Even with financial assistance, however, many merchants are unwilling to accept the administrative burden accompanying participation in the program. This can result in the use of food stamps becoming unduly burdensome. For example, if the grocery stores closest to a food stamp recipient decline to participate in the program, the recipient can be forced to travel a considerable distance in order to purchase goods using the food stamps. This is particularly troublesome in that those receiving food stamps are most likely those who lack access to private transportation in order to travel to the merchant who does accept food stamps.

Further, food stamp programs adhere to a very traditional model of retailing in which all or nearly all of the foodstuffs which may be purchased using the benefits provided under the program are only available at the local grocery store. However, goods suitable for purchase using food stamps are available in a wide variety of retail stores. For example, a store specializing in athletic equipment may elect to sell a limited number of food items identified as appealing to people who exercise regularly. Convenience stores, on the other hand, sell a wide variety of goods, including staples such as milk and bread, suitable for purchase with food stamps. Thus, there are many retail outlets to which participation in the food stamp program may be extended but that do not currently participate due to the high administrative costs associated with, and/or an expectation of a relatively low volume of sales under, the program.

Finally, the proliferation of financial assistance programs has resulted in additional inefficiencies which consume a portion of the funds intended to be spent to assist those in need. For example, many of those in financial need are qualified to receive aid from multiple sources. For example, a food stamp recipient may also qualify for state unemployment insurance, aid to dependent children and/or WIC. If so, each agency providing financial assistance to a particular individual employs a separate process to distribute funds to that individual. Clearly, if a single process may be used to distribute financial assistance from multiple agencies to an individual, the cost of distributing benefits to that individual could be reduced, thereby decreasing the total cost of administering the various aid programs.

Commercial payment processing networks are employed in a growing number of commercial and/or financial transactions. In such transactions, the role of the commercial payment processing network is to ensure that a party which provides goods and/or services to another is reimbursed for those goods and/or services. Briefly, the commercial payment processing network electronically couples the issuer of a debit or credit card with the merchant or, more specifically, an acquirer who maintains funds on behalf of the merchant. When a party seeks to pay for a transaction using a credit or debit card, the commercial payment processing network notifies the issuer of the card to transfer the requested amount of funds to the acquirer. It is contemplated that it would be advantageous to employ a commercial payment processing network in a system and method for distributing benefits provided under financial assistance programs. Accordingly, disclosed herein is such a system and method.

SUMMARY

In one embodiment, disclosed herein is a device suitable for use in initiating a commercial transaction. The disclosed device is comprised of a storage media and data encoded therein. The data encoded in the storage media includes information identifying a recipient of financial assistance and a commercial payment processing network to be used when completing the transaction. The date encoded in the storage media may also include the amount of financial assistance provided to the recipient and/or restrictions (if any) on usage of the provided financial assistance. In one aspect, the device is imprinted with the name of the recipient and indicia identifying the commercial payment processing network.

In another embodiment, disclosed herein is a method for providing government benefits to a recipient. In accordance with the disclosed method, an issuer produces a consumer access device (or "card"), imprinted with the name of the recipient of government benefits and indicia representative of a commercial payment processing network to be used when processing transactions which employ the card. Encoded in the card is data identifying the commercial payment processing network and the issuer of the card. Once produced, the card is provided to the recipient of government benefits. In accordance with an aspect thereof, a cash value of the government benefits to be provided to the recipient is determined and the name of the recipient and the cash value of the benefits are provided to the issuer. Using this information, the card produced by the issuer may have a cash value generally equal to the cash value of the government benefits to be provided to the recipient.

In further aspects thereof, the recipient may use the card as a form of payment for goods and/or services received from a merchant or other business entity during a transaction therewith. In turn, the merchant transmits a message requesting authorization of the transaction to the issuer via the commercial payment processing network. To enable the issuer to determine whether to authorize the transaction, the message also identifies the recipient and the cash value of the goods and/or services to be provided to the recipient if the transaction is completed. In response thereto, the issuer transmits a reply message which either authorizes or declines the transaction. Typically, the transaction is authorized when the value of the goods and/or services is less than the balance of the card but rejected if the balance of the card is greater than the value of the goods and/or services. In this aspect the balance of the card is the cash value of the government benefit provided to the recipient less the value of the goods and/or services provided to the recipient in connection with prior transactions initiated using the card.

In still further aspects thereof, the issuer is further provided with a set of restrictions on the use of the government benefits provided to the recipient. Variously, the set of restrictions may be maintained by the issuer for subsequent use by the issuer to determine whether to authorize the transaction or encoded into the card so that the merchant or the commercial payment processing network may determine whether the transaction complies with any restrictions placed on the use of the card. In the alternative, the governmental entity or issuer may provide the merchant or the commercial payment processing network with the set of restrictions. If the commercial payment processing network is responsible for identifying violations of any such restrictions, the commercial payment processing network shall also be responsible for issuing the message declining the transaction as not in compliance with restrictions imposed on the use of the card. Variously, the benefits may be provided by a single governmental entity or by multiple government entities. When multiple governmental entities are involved, the cash value of the card is the sum of the cash value of the benefits to be provided to the recipient by the various governmental entities.

In still another embodiment, disclosed herein is a commercial payment processing network comprised of a server configured to process transactions funded by government benefits encoded in consumer access devices (or "cards") imprinted with indicia identifying the commercial payment processing network. In one aspect, identifying information for an issuer is encoded in the cards and, in this aspect, the server is further configured to exchange information related to the transactions with the issuer via an electronic coupling therebetween. In another, the server is further configured to exchange information related to the transactions with acquirers of the cash value of the transactions via an electronic coupling therebetween and, in still another, the server is further configured to reject the transactions based upon failures of the financial transactions to comply with restrictions on the use of the government benefits encoded in the cards.

In still another embodiment, disclosed herein is an electronic financial network which includes a plurality of consumer access devices (or "cards"), each encoded with information identifying a recipient of a determined amount of government benefits, and a commercial payment processing network. The electronic financial network further includes a commercial or financial transaction server system coupled to an issuer server system by the commercial payment processing network. The issuer server system maintains information related to each one of the plurality of cards, including identifying information for the recipient of the card, the government benefits to be provided to the recipient of the card, a cash value for each of the government benefits to be provided to the recipient of the card and any restrictions on transactions initiated with the card. Each of the plurality of cards may be used to initiate transactions at terminals coupled to the transaction server system. Information related to the initiated transactions is exchanged between the transaction server system and the issuer server system by the commercial payment processing network. The information transported by the commercial payment processing network includes requests for authorizing the transaction server system to complete transactions, reply messages authorizing the transaction server system to complete transactions and reply messages denying the transaction server system authorization to complete transactions. To determine whether to authorize completion of a transaction initiated with one of the cards, the issuer server system may include means for determining whether to authorize completion of transactions initiated with the cards based upon information related to the cards maintained by the issuer server system and information, received from the commercial payment processing network, related to the transactions themselves.

In one aspect of the disclosed embodiment, the financial server system is configured to include one or more point-of-sale (POS) systems, each configured to conduct transactions initiated using the first card, and a merchant server system coupled to the POS systems and the commercial payment processing network. In this aspect, the POS systems transmit information, collected from the cards, to the merchant server system. In turn, the merchant server system transmits the information to the commercial payment processing network for forwarding to the issuer server system. In another, the electronic financial network is configured to include an acquirer server system coupled between the merchant server system and the commercial payment processing network. In this aspect, the acquirer server system transmits information related to transactions, received from the merchant server system, to the commercial payment processing network. Upon approval of these transactions, the issuer server system transmits funds generally equal to the cost of the goods and/or services associated with the transactions to the acquirer server system via the commercial payment processing network and updates information related to the cards maintained thereby to account for the funds transmitted to the acquirer server.

DESCRIPTION OF THE DRAWINGS

For a more complete understanding of the present invention, and for further details and advantages thereof, reference is now made to the drawings accompanying this disclosure, in which.

DETAILED DESCRIPTION

Figure 1A:
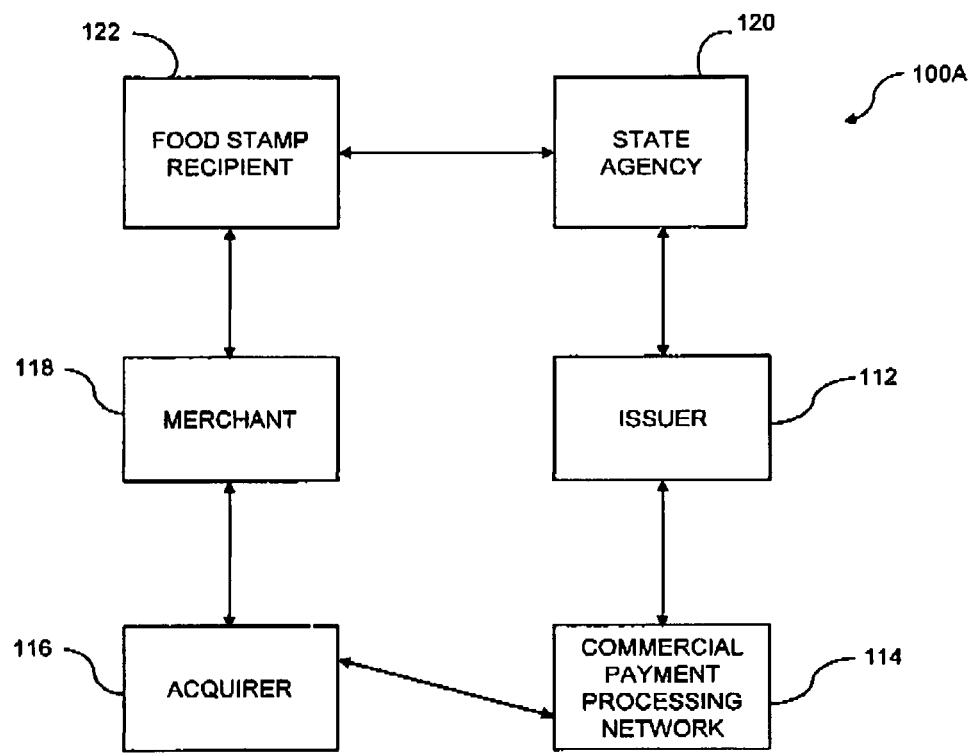
FIG. 1A is a block diagram illustrating a financial assistance program which incorporates a commercial payment processing system therein.

The teachings set forth herein are susceptible to various modifications and alternative forms, specific embodiments of which are, by way of example, shown in the drawings and described in detail herein. It should be clearly understood, however, that the drawings and detailed description set forth herein are not intended to limit the disclosed teachings to the particular form disclosed. On the contrary, the intention is to cover all modifications, equivalents and alternatives falling within the spirit and scope of that which is defined by the claims appended hereto.

Figure 1B:
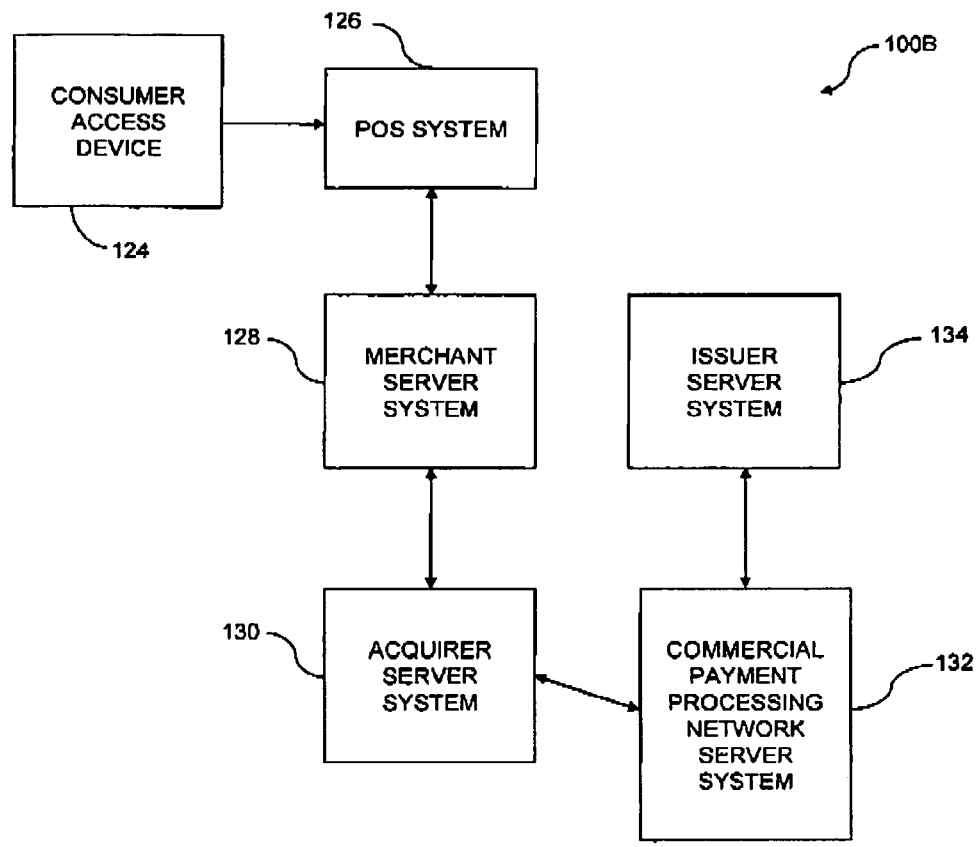
FIG. 1B is a block diagram illustrating a commercial payment processing system constructed in accordance with the teachings disclosure herein and suitable for implementing the financial assistance program of FIG. 1A.
Figure 2:
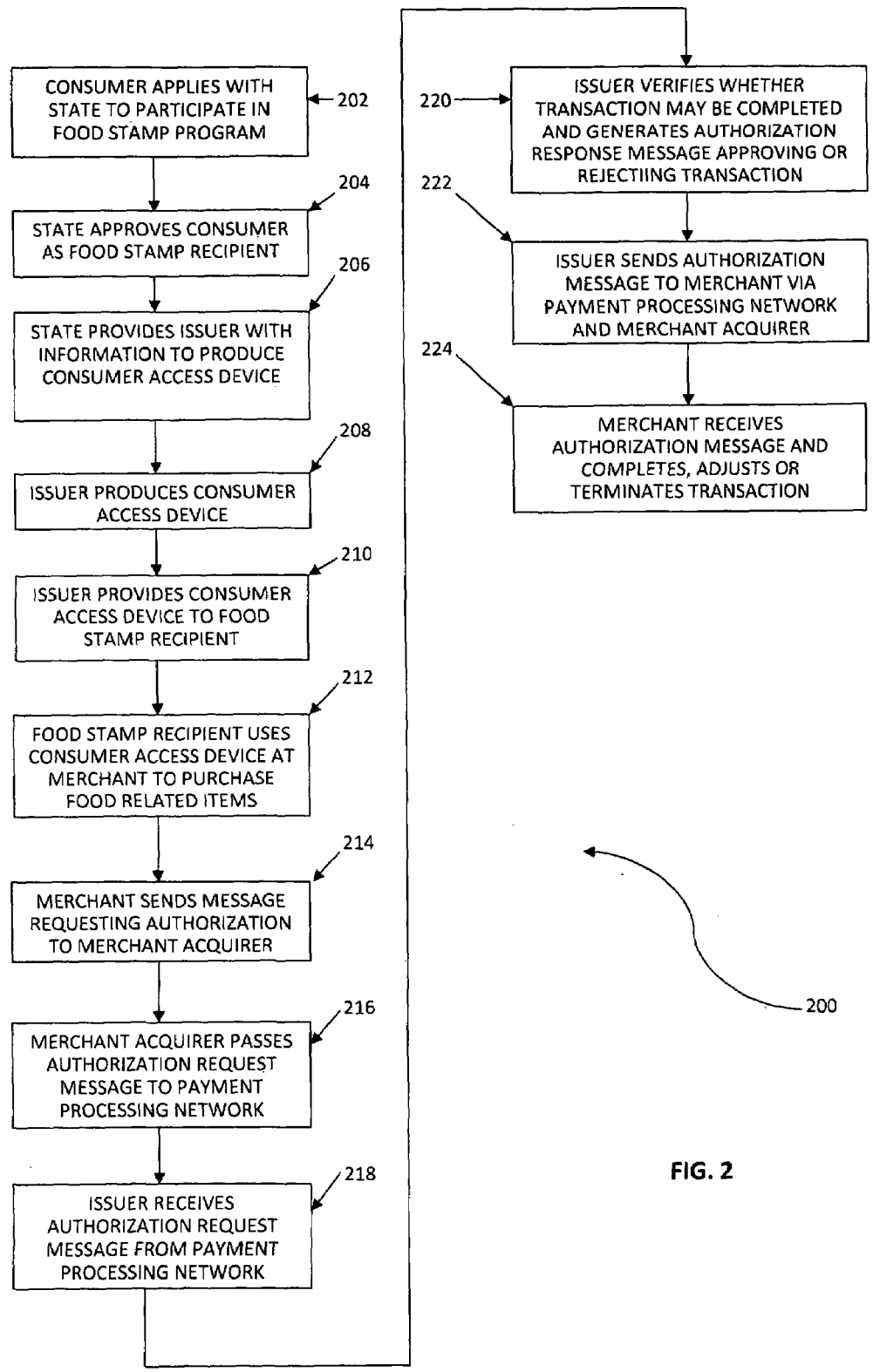
FIG. 2 is a flow chart of a process by which the commercial payment processing system of FIG. 1B attends to the transfer of benefits from a financial assistance program to a recipient thereof.

Referring, in combination, to FIGS. 1A, 1B and 2, a commercial payment processing system 100b constructed in accordance with the teachings of the present disclosure and suitable for implementing a financial assistance program 100a in which a governmental entity provides financial assistance to a recipient who, in turn, uses the financial assistance to conduct transactions with a business entity. For example, the present disclosure describes a particular type of financial assistance program 100a, specifically, the Food Stamp Program (FSP) administered by the Food and Nutrition Service (FNS) of the United States Department of Agriculture (USDA). Under the FSP, food stamps are distributed to qualifying recipients 122, for example, persons with low income, who use the food stamps to purchase foodstuffs at a participating merchant 118, typically, a grocery store. Of course, the FSP is but one example of a financial assistance program 100a suitable for implementation by the commercial payment processing system 100b and it is fully contemplated that the commercial payment processing system 100b is equally suitable for implementing a wide variety of financial assistance programs 100a other than the specific financial assistance program described herein.

For example, it is contemplated that the benefit provider may be the federal government (or agency thereof, state government, local government such as a county, city or town government (or agency thereof or a regional governmental authority. It is further contemplated that the benefit provider may be a private charitable organization, a for-profit business organization, or even an individual. Likewise, it is contemplated that the benefit provided may be comprised of an unrestricted grant of cash or a restricted grant of cash, e.g., a grant of cash which can only be used for the purchase of (1) a specified good sold at any merchant, (2) a specified type of goods sold at any merchant; (3) a specified good or type of goods sold at a specified merchant or (4) any type of goods sold at a specified merchant. Of course, it should be readily appreciated that restricted grants of cash may be comprised of other combinations of these or other restrictions as well.

Further by way of example, it is contemplated that the recipient 122 may be an individual who has qualified to receive the benefit. For example, a person who has verifiable income less than a predetermined threshold may qualify to receive food stamps from a state agency responsible for administering the FSP locally. It is further contemplated that the recipient 122 may be a charitable organization such as a 501(c)(3) corporation. For example, the recipient 122 may be a local food bank which distributes food to impoverished individuals. Again, the foregoing are provided purely by way of example and that there are any number of other combinations (e.g., benefit provider, benefit and recipient) which may be instead employed.

Further aspects of the transfer of benefits from a provider to a recipient will now be described with respect to a specific example in which the benefit provider is a state agency 120, the benefit is food stamps—vouchers which may be used to purchase specified types of food items up to the specified value of the vouchers—and the recipient 122 is a food stamp recipient, e.g., persons that are unemployed, employed but having a relatively low income, employed but having a relatively large number of dependents or a combination of these or other factors which qualify them as being entitled to receive food stamps from the state. In this example, as well as many (but not all) of the other examples addressed hereinabove, the commercial payment processing system 100b implementing the financial assistance program 100a in which the state agency 120 provides food stamps to the food stamp recipient 120 involves the participation of four other entities—an issuer 112, a commercial payment processing network 114, an acquirer 116 and a merchant 118. Of course, it is fully contemplated that a lesser or greater number of entities may participate in the payment processing system. For example, the commercial payment processing network 114 may also serve as the issuer.

Each of the issuer 112, the commercial payment processing network 114, the acquirer 116 and the merchant 118 operate one or more electronic devices for processing a portion of a transaction which provides the benefit to the recipient. In the example illustrated herein, the merchant operates a point-of-sale (POS) system 126 and a merchant server system 128 coupled to the POS system 126, the acquirer 116 operates an acquirer server system 130 coupled to the merchant server system 128, the commercial payment processing network 114 operates a commercial payment processing network server system 132 coupled to the acquirer server system 130 and the issuer 112 operates an issuer server system 134 coupled to the commercial payment processing network server system 132. While FIG. 1B illustrates the couplings between the merchant server system 128 and the acquirer server system 130, between the acquirer server system 130 and the commercial payment processing network server system 132 and between the commercial payment processing network server system 132 and the issuer server system 134 as discrete interconnections, it is fully contemplated that one or more of the illustrated interconnections may be accomplished through use of a shared network such as the Internet. Of course, in the event that a public network is employed, messages exchanged between the various components of the commercial payment processing system 100b should be encrypted or otherwise secured from interception by a third party.

As disclosed herein, the term "server system" encompasses all known types of computing devices, for example, personal computers (PCs), which perform the functions set forth hereinbelow, whether such functions are performed by a single computing device or multiple computing devices networked or otherwise interconnected with one another. As further disclosed herein, a "server system" is comprised of a processor subsystem coupled to a memory subsystem by a bus subsystem. The term "processor subsystem" encompasses the total processing capacity of the server system, whether such processor capacity is embodied as a single processing device, for example, a microprocessor, multiple processing devices, for example, coprocessors, located in a single computing device, multiple processing devices residing in respective computing devices interconnected with one another or any combinations thereof. Similarly, the term "memory subsystem" encompasses the total memory capacity of the server subsystem, whether such memory capacity is embodied as main, auxiliary or other type of memory of a single computing device, main, auxiliary or other type of memory of multiple computing devices interconnected with one another, a stand-alone memory device, or any combinations thereof.

Finally, the term bus subsystem encompasses all of the conductors and/or other types of connectors used to transfer address, data and control signals between the various components and/or devices which collectively comprise the server system.

The process 200 by which food stamps are transferred to a recipient commences at 202 with an applicant, e.g., a consumer that believes that they are entitled to receive food stamps, submitting an application to receive food stamps to a state agency 120 charged with the task of distributing food stamps to qualified applicants. Depending on the particular application system employed by the state agency 120, it is contemplated that the consumer may be permitted to submit their application to receive food stamps in person, over the phone and/or via the Internet. The state agency 120 will then process the application. For example, the state agency 120 may have a set of guidelines which define those people entitled to receive food stamps and would examine the application and/or conduct an investigation to determine whether the applicant is indeed eligible to receive food stamps from the state agency 120.

Upon confirming that the applicant qualifies for participation in the food stamp program, the process 200 continues to 204 where the state agency 120 approves the applicant for enrollment in the program. Having enrolled the applicant (hereafter referred to as food stamp recipient 122, the state agency 120 initiates a process by which the food stamp recipient 122 shall receive food stamps from the state agency 120. Accordingly, at 206, the state 120 provides the issuer 112 with information, to be used by the issuer 112, to both produce and subsequently monitor the use of a consumer access device 124, to be distributed to the food stamp recipient 122, to enable the food stamp recipient 122 to purchase eligible products in accordance with the guidelines of the FSP. Typically, the state agency 120 provides the issuer 112 with sufficient information to identify the food stamp recipient 122, for example, the name and address of the food stamp recipient 122, and the amount of funds, for example, a cash value in dollars, to be provided to the food stamp recipient 122 as a participant in the FSP. Variously, the state agency 120 may pay, to the issuer 112, the cash value of the access card 124 at this time or, at a mutually agreeable subsequent point in time. Further, the state agency 120 may elect to pay a fee to the issuer 112 to cover the cost of producing the consumer access device 124 directly or may agree that the issuer 112 take a predetermined fee for each transaction for which the consumer access device 124 is used. Variously, the fee for use of the access card may be a flat fee per transaction or a variable fee set as a percentage of the amount of the transaction and may be charged to the state agency or, if desired, debited from the cash value of the consumer access device 124.

In one embodiment, the state agency 120 shall also provide the issuer with any restrictions to be placed on the funds applied to the consumer access device 124. Depending on the type of financial assistance to be provided to a recipient, the funds may be comprised of a one-time transfer of cash or, as is the case with food stamps, periodic transfers of cash made on a regular basis, for example, on the first of each month. Likewise, restrictions may be applied on the permitted usages of the consumer access device 124. For example, restrictions commonly applied on the funds provided to the food stamp recipient 122 may include time restrictions, e.g., all of the provided funds must be used within a predetermined time period, for example, during the month in which the funds were disbursed. The state agency 120 may also provide a list of the type or types of goods that may be purchased using the funds and/or the type or types of goods that may not be purchased using the funds. For example, the state agency 120 may allow the food stamp recipient 122 to use the provided funds to purchase bread but bar the food stamp recipient 122 from using the provided funds to purchase alcohol.

If desired, all of the foregoing information (or selected components thereof) may be maintained in the memory subsystem of the issuer server system 134, stored in the consumer access device 124 or both. At a minimum, the name of the food stamp recipient 122 (or a set of alpha-numeric characters suitable for anonymously identifying the food stamp 122) should be stored in the consumer access device 124. Typically, the cash value assigned to the consumer access device 124 is maintained in the memory subsystem of the issuer server system 134. A shortcoming to configuring the commercial payment processing system 100b in this manner is that transactions may only be completed when all components of the commercial payment processing system 100b are on-line. If, however, the cash value of the consumer access device 124 is encoded onto the consumer access device 124, transactions may be completed at other times as well, for example, when the issuer server system 134 is off-line. Such a configuration is, however, less common.

Likewise, while any restrictions on the use of the consumer access device 124 may be stored on the consumer access device 124, more commonly, any such restrictions are maintained at another location, for example, the memory subsystem of the issuer server system 134, a memory device associated with the POS system 126 or even the memory subsystem of one or more of the merchant server system 128, the acquirer server system 130 or the commercial payment processing network server system 132. In this regard, while, in the interest of efficiency, it may be preferable that any restrictions on the use of the consumer access device 124 be stored at the POS system 126, it should be recognized that certain drawbacks may result from the foregoing. For example, it is entirely possible that the operator of the POS system 126 (or others nearby) will learn that the food stamp recipient 122 is seeking to purchase goods with food stamps and not a credit or debit card, particularly if the transaction is rejected as violating a restriction associated with the consumer access card 124. Thus, if discretion is of particular importance, it may be preferable to store any restrictions on the use of the consumer access device elsewhere, for example, on the issuer server system 134. Further, in the event that the consumer access device 124 is associated with benefits provided by multiple programs, for example, food stamps provided by the state agency and unemployment benefits provided by the state workforce commission, it may be more advantageous to store restrictions on the use of the consumer access device 124 on the issuer server system 134 as it is more likely that the issuer server system 134 will be able to readily ascertain the specific benefit that the food stamp recipient 122 is seeking to access using the consumer access device 124.

Proceeding now to 206, upon receiving the necessary information and, most likely, an amount of cash generally equal to the cash value of the benefits that the state agency has determined are to be provided to the food stamp recipient 122, the issuer 112 produces an consumer access device 124 to be used by the food stamp recipient 122 to receive the benefits provided by the state agency 120, here, by enabling the food stamp recipient 122 to purchase goods having a total value generally equal to the cash value of the benefits to which the food stamp recipient is entitled. While it is contemplated that the consumer access device 124 may be variously configured, as disclosed herein, the consumer access device 124 is similar in size, shape and overall appearance to the credit, debit and/or gift cards used by most consumers today. Accordingly, in the disclosed embodiment, the consumer access device 124 is configured to have a generally rectangular shape with a length of about 8.5 cm, a height of about 5.4 cm and a thickness of about 1 mm.

A front side surface of the consumer access device 124 is embossed, preferably using raised alpha-numeric characters, with the name of the food stamp recipient 122, an identification number for the consumer access device 124 and, if desired, an "expiration date" for the consumer access device 124. If the consumer access device 124 is embossed with an expiration date, in one embodiment, the expiration date may identify the last day on which the consumer access device 124 may be used for the purchase of goods using the funds associated therewith. In another, the consumer access device 124 may be imprinted with the day by which the food stamp recipient 122 must verify continued eligibility for participation in the food stamp program or be faced with losing their benefits under the program.

It is preferred that the consumer access device 124 used to provide benefits to the food stamp recipient 122 be virtually indistinguishable from other consumer access devices, e.g., credit and debit cards, in wide use today. To achieve this, it is preferred that the front side surface of the consumer access device 124 be imprinted with the name and, if appropriate, a logo of the issuer 112 and an emblem or other indicia representative of the name of the commercial payment processing network 114 employed during the process 200 to reimburse the merchant 118 for the cost of goods purchased by the food stamp recipient 122 using the consumer access device 124 by attending to the transfer of funds from the issuer 112 to the acquirer 116. Variously the issuer 112 may be a bank, credit union or other financial institution, for example, Bank of America, in the business of issuing consumer access devices such as credit or debit cards. Among the leading commercial payment processing networks which may serve as the commercial payment processing network 114 for the process 200 are Visa, MasterCard, Discover and American Express. To further emulate the credit and debit cards carried by consumers not receiving food stamp benefits, the identification number embossed on the consumer access device 124 should be configured in a manner generally identical to the identification number used by the payment processing network whose emblem is imprinted on the front side surface thereof. For example, if the Visa payment processing network is employed to reimburse merchants for goods purchased by the food stamp recipient 122, the consumer access device 124 should be embossed with a 16-digit account number divided into four groups of digits, each having four digits, with the first digit of the first group being the number "4." In one embodiment, it is contemplated that the issuer 112 and the commercial payment processing network 118 may be the same business entity. If so, the appearance of the consumer access device 124 should be modified in a corresponding manner.

The consumer access device 124 further includes a rear side surface in which a storage media encoded with, at a minimum, sufficient information to identify the food stamp recipient 122, is embedded or otherwise fixedly attached thereto. In further emulation of the credit and debit cards currently in use, it is contemplated that the storage media is comprised of an approximately 0.8 cm wide magnetic strip extending lengthwise, across the consumer access device 124, approximately 0.5 cm below and in a generally parallel relationship with a side surface thereof. Of course, it is fully contemplated that the consumer access device 124 and/or storage media may have alternate configurations. In one such example, the consumer access device 124 may be a so-called "smart card" and the storage media may be an integrated circuit incorporated therein. In another such example, the storage media may be omitted and the information to be encoded in the storage media may instead be imprinted on the consumer access device 124 as a bar code. Finally, it is contemplated that the configuration of the consumer access device 124 may vary in configuration to take into account any evolution in the shape of credit and debit cards and/or the manner by which the ordinary consumer purchases goods and/or services.

At 210, the consumer access device 124 produced by the issuer 112 is provided to the food stamp recipient 122. In one embodiment, it is contemplated that the issuer 112 would deliver the consumer access device 124 directly, for example, by mailing the consumer access device 124 to the address of record for the food stamp recipient 122. In another, it is contemplated that the issuer 112 would deliver the produced consumer access device 124 to the state agency 120. In turn, the state agency 120 would deliver the consumer access device 124 to the food stamp recipient 122. Ideally, the consumer access device 124 would be delivered generally contemporaneously with notification of the acceptance of the applicant into the food stamp program. It is recognized, however, that some delay between the two may inevitably result. Any such delay should, however, be minimized wherever possible.

In many cases, the consumer access device 124 would be delivered together with a list of restrictions, if any, on use of the card. Such restriction may include, among others, the total value, in dollars, of goods which may be purchased with the consumer access device 124, the quantity of a specific good or goods which may be purchased using the consumer access device 124, the type of goods which may not be purchased using the consumer access device 124 and/or the expiration date (if any) after which goods may not be purchased using the benefits provided through the access card 124. Of course, the restrictions listed hereinabove are purely exemplary and it is fully contemplated that still other restrictions may be placed on the purchase of goods using the funds available through the consumer access device 124. It is further contemplated that no restrictions may be placed on the goods that may be purchased using the benefits provided through the consumer access device 124. For example, if the benefit to be provided to a recipient is unemployment insurance, usage of the funds available through the consumer access device 124 would most likely be unrestricted.

At 212, the food stamp recipient 122 employs the consumer access device 124 in a transaction such as a purchase of goods at a selected merchant 118. For example, if the food stamp recipient 122 seeks to purchase foodstuffs at a grocery store, the food stamp recipient 122 would select the items to be purchased and present the selected items at the POS system 126 operated by the merchant 118. While a wide variety of POS systems are employed in the retail industry, a typical POS system includes a first data entry system, for example, an optical scanner utilized to scan the universal price code (UPC) for each item selected by the food stamp recipient 121 into the POS system 126, a processor for associating the UPC codes with the specific goods being purchased and the price of those goods and calculating the total cost of the transaction purchase, a second data entry system, for example, a device having plural pushbuttons for consumers to identify the consumer access device to be employed for rendering payment for the goods being purchased and an electronic scanner utilized for reading data encoded on a magnetic strip on a back side of consumer access devices "swiped" through or otherwise inserted into a slot in the scanner and a printer which, subsequent to the purchase being completed, generates a receipt comprised of a list of the goods purchased, the price of each one of the good purchased, the total cost for the purchase of the goods and the manner in which payment for the goods was rendered.

When a cashier or other operator of the POS system 126 has determined the total cost of the goods to be purchased and requests payment for those goods, the food stamp recipient 122 initiates payment for the proposed purchase using the consumer access device 124. For example, for a POS system including the second data entry device described herein, the food stamp recipient 122 would first indicate that the consumer access device 124 is a "credit card" (thereby eliminating any embarrassment which may result from the food stamp recipient 122 from being required to identify themselves as a person receiving financial assistance from the government) and then swipe the consumer access device 124 through the slot in the electronic scanner.

At 214, the POS system 126 collects selected information regarding the purchase and transmits the information to the merchant server system 128. Having transmitted the information to the merchant server system 128, the purchase of the selected goods is considered to be a pending transaction. Using the transmitted information, the merchant server system 128 generates a message requesting authorization of the pending transaction and forwards the message to the acquirer server system 130. Of course, it is fully contemplated that, in the alternative, the POS system 126 may generate the message and the merchant server system 128 merely forward the generated message to the acquirer server system 130. To facilitate making a determination as to whether the request for authorization should be granted, the message should contain both details describing the requested purchase and information stored on the consumer access device 124. While the specific details of the requested purchase to be transported to the acquirer server system 130 as part of the message requesting authorization of the pending transaction may be varied, the provided details should identify the total cost of the proposed purchase and, if the issuer server system 134 is to determine whether the proposed purchase complies with the restrictions on use of the consumer access device 124, each product (and/or type of product) included in the proposed purchase. Likewise, while the specific information stored in the consumer access device 124 to be transported to the acquirer server system 130 as part of the message requesting authorization of the pending transaction may be varied, the transported information should identify the food stamp recipient 122 and the consumer access device 124 used thereby in sufficient detail so that it may be associated with information, maintained by the issuer server system 134, regarding the food stamp recipient 122 and the consumer access device 124 issued thereto.

Continuing on to 216, the acquirer server system 130 passes the message requesting authorization of the pending transaction to the commercial payment processing network server system 132. As previously set forth, the commercial payment processing network server system 132 is responsible for (1) transporting messages requesting authorization of pending transactions received from plural acquirer server systems to an issuer server system operated by an issuer identified in the messages as having issued the consumer access devices being employed in the pending transactions; (2) transporting reply messages authorizing pending transactions from the issuer server system to the acquirer server systems originating the requests; (3) transporting reply messages rejecting pending transactions from the issuer server system to the acquirer server systems originating the requests and (4) for each authorized transaction, transferring funds in an amount equal to the amount specified in the corresponding request messages from the issuer server system to the acquirer server systems originating the requests. In this regard, it should be noted that the commercial payment processing network server system 132 exchanges messages and/or transfer funds between plural acquirer server systems (each of which is typically operated by a bank or other financial institution that handles funds on behalf of merchants retaining the services thereof and plural issuer server systems (each of which is typically operated by a bank or other financial institution that issues consumer access devices) and that, to determine the destination of each received message and/or transfer of funds, the commercial payment processing network server system 132 examines the contents of each message and/or transfer received thereby.

At 218, the issuer server system 134 receives a message, transmitted by the commercial payment processing server system 132 requesting that the issuer server system 134 approve authorization of the pending purchase. As previously set forth, the message received by the issuer server system 134 requesting authorization of the proposed purchase contains an identification of the food stamp recipient 122, the amount of the purchase which is the subject of the pending transaction and, if appropriate, the good and/or type of goods to be purchased. From this information, the issuer server system 134 determines at 220 whether to authorize completion of the pending transaction in accordance with techniques to be more fully set forth below. Upon determining whether to authorize or decline the pending transaction at 220, the process continues to 222 where the issuer server system 134 transmits an authorization message to the POS system 126 via the commercial payment processing network server 132, the acquirer server system 130 and the merchant server system 128. As will be more fully described below, after receipt of the authorization message at 224, the pending transaction may be completed (if the authorization message indicates that the pending transaction should be completed, adjusted (if the authorization message indicates that the pending transaction should be declined but the food stamp recipient 122 indicates a willingness to adjust the pending transaction so that the adjusted transaction would be accepted) or terminated (if the authorization message indicates that the pending transaction should be declined and the food stamp recipient 122 is unwilling or unable to adjust the pending transaction so that the adjusted transaction would be accepted). Of course, the ability to adjust the pending transaction may be dependent on any number of other considerations, for example, whether the operator of the POS system 126 is aware that food stamps are being used to pay for the proposed transaction or whether the food stamp recipient 122 and/or the operator of the POS system 126 can be advised discretely that the inclusion of prohibited goods is the cause of the transaction being declined.

Returning to 220, it is noted that, while it is fully contemplated that a variety of processes may be employed to determine whether the pending transaction should be completed, one such process is as follows. The issuer server system 134 first compares the type of goods that the food stamp recipient 122 seeks to purchase as part of the pending transaction to any restrictions on the benefits provided by the state agency 120 to the food stamp recipient 122 and previously associated, by the issuer, with the consumer access device 124 provided to the food stamp recipient 122. If the proposed transaction violates any of the restrictions associated with the benefits provided to the food stamp recipient 122, for example, if the benefit provided to the food stamp recipient 122 prohibits use of the funds provided thereunder to purchase alcoholic beverages and the message requesting authorization of the pending transaction indicates that the food stamp recipient 122 is seeking to purchase an alcoholic beverage, the issuer server system 134 generates an authorization message rejecting the pending transaction and transmits it to the POS system 126 via the commercial payment processing network server system 132, the acquirer server system 130 and the merchant server system 128. In turn, the POS system 126 generates a message, for example, by illuminating a display visible to the cashier and/or the food stamp recipient 122 indicating that the pending transaction had been declined, for example, by generating the statement "transaction declined" on a light emitting diode (LED) display. If desired, of course, the message rejecting the pending transaction may further provide the basis for declining the transaction had been declined and the LED display may further indicate the reason why the transaction had been declined, for example, by generating the statement "transaction declined-purchase includes alcoholic beverages."

Presuming that the goods contained in the pending transaction meet any restrictions as to the use of the benefit provided to the food stamp recipient 122 by the state agency or, in the alternative, if the benefit provided to the food stamp recipient 122 by the state agency 120 was of a nature that no restrictions were placed on the use thereof, the issuer server system 134 would compare the amount of the pending transaction, i.e., the cash value of the goods to be provided to the food stamp recipient 122 to the remaining benefit provided to the food stamp recipient 122 by the state agency 120. If the remaining benefit to be provided to the food stamp recipient 122 has a cash value that is equal to or exceeds the amount of the pending transaction, the issuer server system 134 generates an authorization message approving the pending transaction and transmits the authorization message to the commercial payment processing server system 132. In turn, the commercial payment processing server system 130 passes the authorization message to the acquirer server system 130 and on to the merchant server system 128 and the POS system 126. In this instance, however, the POS system 126 generates a message indicating that the pending transaction had been authorized, for example, by illuminating the LED display visible to the cashier and/or the food stamp recipient 122 with the statement "transaction approved."

To ensure that the food stamp recipient 122 is prevented from using the consumer access device 124 to obtain more benefits than the amount, provided thereto by the state agency 120, the issuer server system 134 must update the information related to the food stamp recipient 122 and the consumer access device 124 provided thereto after completion of a pending transaction. In this regard, it was previously set forth that, for each food stamp recipient 122 that the issuer 112 provides a consumer access device 124 thereto, the issuer 112 shall store an entry, in the memory subsystem of the issuer server system 134, describing the recipient (or the consumer access device provided thereto) and the benefits that the recipient is entitled. For example, the entry may provide the name of the food stamp recipient 122 (or an identification number associated with the food stamp recipient 122 or the consumer access device 124 provided thereto), the type of benefit provided (typically expressed as the type of goods and/or services to which the food stamp recipient 122 is entitled to purchase and the amount that the food stamp recipient 122 may spend purchasing the identified type of goods and/or services) and, if appropriate, a list of restrictions (if any) on use on the identified benefit. For example, the entry in the memory subsystem of the issuer server system 134 may indicate that "John Smith" is entitled to purchase (or, in the alternative, "consumer access device 124" may be used to purchase) up to $100 of food and non-alcoholic beverages. In a first, exemplary, use of the consumer access device 124, John Smith purchases $25 of food complying with the restriction that none of the purchased goods may be alcoholic beverages. Upon determining that the pending transaction is (1) a purchase of food and/or beverages (2) in compliance with the restriction that none of the beverages to be purchased may be comprised alcoholic beverages and (3) the cash value of the compliant goods that John Smith is entitled to purchase ($100) is equal to or greater than the cash value of the pending transaction ($25), the issue server system 134 would generate an authorization message approving the transaction. In addition, the issue server system 134 would reduce the amount that John Smith may spend purchasing additional amounts of compliant goods by the amount of the approved transaction, i.e., John Smith is now entitled to purchase $75 of compliant goods and/or services.

In one embodiment, it is contemplated that the consumer access device 124 may be produced by the issuer 112 to reflect multiple benefits provided by multiple sources, for example, food stamps provided by one state agency and unemployment benefits provided by a second state agency. By doing so, it is contemplated that a single disbursement process may be used to provide multiple benefits to a recipient, thereby resulting in considerable efficiencies in the distribution of benefits. Modification of the manner of producing the access card 124 is relatively straightforward. Each state agency employing the commercial payment processing system 100b to distribute benefits to recipients would simply identify each recipient of a benefit and the type, amount and restrictions (if any) on the benefit to be provided to the identified recipient. The issuer 112 would identify recipients of multiple benefits and generate a single consumer access device 124 containing all of the benefits to be provided to the recipient. If the type of benefits provided to the recipient and the restrictions imposed on the provided benefits are the same, the benefits may be readily combined. For example, if a federal agency provided a recipient with $100 of food stamps and a state agency provided the recipient with an additional $25 of foods stamps, the two benefits may be combined into a single entry which entitles the recipient to purchase $125 of food and/or non-alcoholic beverages and the value of approved transactions of compliant goods and/or services may be deducted from the value of the benefit provided to the recipient may proceed in the manner previously described. If the benefits differ, however, the issuer server system 134 would most likely need to segregate the benefits from one another and, for each message requesting authorization of a pending transaction, identify the benefit to be used to fund the pending transaction and issue approvals/rejections based upon the amount of funds associated with the identified benefit.

Returning now to 224, upon receiving the authorization message indicating that the pending transaction is approved, the cashier or other operator of the POS system 126 may now complete the transaction by formally turning possession of the goods over to the food stamp recipient 122. As the consumer access device 124 proffered by the food stamp recipient 122 is indistinguishable from a traditional credit card, at no point during the transaction was the food stamp recipient 122 identified as a recipient of government benefits. Further, while those instance in which the transaction was denied would be embarrassing to the food stamp recipient, the denial of a transaction initiated using the consumer access device 124 would most likely be presumed to be the result of the food stamp recipient 122 having exceeded their credit limit on their credit card and/or attempted a purchase subsequent to the credit issuer having temporarily suspended charging privileges, most commonly, for not making a timely payment on their account. While both of the foregoing would also be a source of embarrassment, such occurrences have happened to consumers of all economic statuses and, as a result, would not be necessarily be attributed to the food stamp recipient 122 receiving benefits from the government. Indeed, if discretion is of upmost concern, the commercial payment processing system 100b may be configured such that, in the event that the food stamp recipient 122 initiates a transaction using the consumer access device 124 that violates any restrictions imposed on the use of the benefits provided thereto or exceeds the remaining cash value of the provided benefit, the issuer server system 134 may simply decline to generate any reply message. If so, the commercial payment processing system 100b would simply "time out" after a predetermined time period has elapsed, a condition that would again result in the cashier or other operator of the POS system 126 declining to complete the transaction. Here, however, the assumption would be that the issuer server system 134 is off-line, a situation that is of no fault of the food stamp recipient 122.

As previously set forth, in one embodiment, it may be desirable that messages declining completion of a pending transaction as violating a restriction on the benefits provided to the food stamp recipient 122 be distinguishable from messages declining completion of a pending transaction as exceeding the remaining value of the benefit provided to the food stamp recipient 122. By doing so, the food stamp recipient 122 would have an opportunity to modify the proposed purchase in an appropriate manner which will insure approval of the transaction, for example, by removing the prohibited goods and/or one or more costly items from the proposed purchase. Once the prohibited goods and/or costly items are removed, the transaction may be resubmitted to the issuer server system 134 and subsequently approved (if all of the prohibited goods have been successfully removed from the pending transaction and/or the cost of the pending transaction has been reduced to a cost less than or equal to the remaining portion of the benefit provided to the food stamp recipient 122). By doing so, the need for the food stamp recipient 122 to either immediately find other financial resources to complete the pending transaction or to surrender the goods to the cashier and depart without purchasing any of the desired goods may be eliminated.

Of course, the order in which the issuer server system 134 checks whether (1) the cost of the pending transaction exceeds the remaining benefit to which the food stamp recipient 122 is entitled and (2) the proposed transaction violates restrictions placed on use of the benefit by the state agency 120 may be varied such that the comparison of the remaining benefit available to the food stamp recipient 122 with the cost of the pending transaction is performed prior to determining whether the pending transaction violation the restrictions on the benefits provided to the food stamp recipient 122 by the state agency 120. Similarly, while, in the disclosed embodiment, the issuer server system 134 checks the proposed transaction to determine if it violates any restrictions on the use of the benefit provided to the food stamp recipient 122 by the state agency 120, it should be noted that the check may occur elsewhere in the commercial payment processing system 100b. For example, it is contemplated that, in alternate embodiments thereof, the commercial payment processing network server system 132, the acquirer server system 130, the merchant server system 128 or the POS system 126 may determine whether the pending transaction violates any restrictions placed on the benefits provided to the food stamp recipient 122.

Generally, the closer to the POS system 126 that the compliance check is performed, the greater the reduction in traffic between the components of the commercial payment processing system 100b located behind the component performing the compliance check. In particular, if the compliance check were performed prior to transportation of the request messages to the issuer server system 134, the likelihood of a bottleneck developing between the commercial payment processing server system 132 and the issuer server system 134— the components of the commercial payment processing system 100b bearing the greatest load could be reduced. For example, if the commercial payment processing network server system 132 was responsible for determining if the proposed transaction violated restrictions placed on the use of the benefits provided to the food stamp recipient 122, the commercial payment processing server system 132 would be the most logical selection to generate the reply message indicating that the proposed transaction was declined. Accordingly, the issuer server system 134 would no longer need to receive those authorization requests containing violations of the restriction imposed on the benefits provided to the food stamp recipient 122 nor generate messages declining such authorization requests. Moreover, for the reduced number of authorization requests received thereby, the issuer server system 134 need only determine whether the cost of the pending transaction exceeds the remaining benefit to be provided to the food stamp recipient 122 and initiate the transfer of funds to the acquirer server system 130 in the event that the pending transaction is approved. In this manner, the processing demands on the issuer server system 134 would be reduced.

It should be recognized, however, that certain complications may result when the POS system 126, the merchant server system 128, the acquirer server system 130 or the commercial payment processing network server system 132 are made responsible for determining whether the pending transaction violates restrictions placed on the benefits provided to the food stamp recipient 122 and/or the use of the consumer access device 124 provided to the food stamp recipient 122. For one, the restrictions on the benefits provided to the food stamp recipient 122/use of the consumer access device 124 would need to be maintained in the memory subsystem of the POS or server system responsible for identifying violations. While the foregoing may not be a major hurdle when one set of restrictions, e.g., the restrictions imposed on the use of food stamps, are in place, the task becomes much more difficult when a single consumer access device is employed to provide multiple benefits. In such cases, the POS or server system would not only need to know the restrictions on each type of benefit but may need to be able to distinguish the types of benefits from one another and to associate each pending transaction with a provided benefit.

While a number of embodiments of a system and method of employing a commercial payment processing in a financial assistance program. have been shown and described herein, modifications thereof may be made by one skilled in the art without departing from the spirit and the teachings of the invention. The embodiments described herein are exemplary only, and are not intended to be limiting. Many variations, combinations, and modifications of the embodiments disclosed herein are possible and are within the scope of the teachings set forth herein. Accordingly, the scope of protection is not limited by the description set out above but is only defined by the claims appended hereto

The invention claimed is:

1. An electronic financial network, comprising:
    an issuer server system issuing a plurality of cards providing government benefits to one or more recipient; and
    a commercial payment processing network operable to couple a financial transaction server system and the issuer server system;
        each of the plurality of cards having a cash value equal to a determined amount of government benefits and encoded with information identifying a recipient of said determined amount of government benefits and said commercial payment processing network;
        wherein financial transactions are initiated with one of said plurality of cards, each of said plurality of cards including information comprised of:
    identifying information for a recipient of said card;
    at least one government benefit to be provided to said recipient of said card; and
    a cash value for each of said at least one government benefit to be provided to said recipient of said card; and
    said commercial payment processing network transporting, via a commercial payment processing server system:
    requests for authorization, sent from the financial transaction server system to the issuer server system, for completion of said financial transactions from said financial transaction server system to said issuer server system; and
    distinguishable transaction suspension reply messages, sent from the issuer server system to said financial transaction server system, each of the distinguishable transaction suspension reply messages including indicia of a reason for suspending a financial transaction, and required adjustments of a product or a type of product included in the financial transaction,
        wherein the financial transaction is resumed and conditionally approved upon fulfillment of said required adjustments.

2. The electronic financial network of claim 1, wherein said issuer server system is operable to maintain said information, said information further comprising: any restrictions on financial transactions initiated with said card.

3. The electronic financial network of claim 1, wherein said issuer server system further comprises means for determining whether to authorize completion of a financial transaction initiated with a first one of said plurality of cards based upon: (1) said information related to said first card maintained by said issuer server system and (2) information, received from said commercial payment processing network, related to said financial transaction.

4. The electronic financial network of claim 3, wherein said transaction server system further comprises:
    at least one point of sale (POS) system configured to conduct transactions initiated using said first card; and
    a merchant server system coupled to said at least one POS terminal and said commercial payment processing network;
    wherein said at least one POS terminals transmits information, collected from said first card during initiation of said transaction, to said merchant server system; and
    said merchant server system transmitting said information, received from said first one of said at least one POS terminal, to said commercial payment processing network; and
    said commercial payment processing network forwarding said information, received from said merchant server system, to said issuer server system.

5. The electronic financial network of claim 4, further comprising:
    an acquirer server system coupled between said merchant server system and said commercial payment processing network, said. acquirer server system transmitting information, received from said merchant server system, to said commercial payment processing network;
    wherein upon approval of said transaction, said issuer server system:
    transmitting funds generally equal to the cost of the goods and/or services, provided to said recipient as part of said financial transaction, to said acquirer server system via said commercial payment processing network; and
    updating said information related to said first card maintained thereby to account for said funds transmitted to said acquirer server.

6. A. method of processing a credit transaction as a debit payment, the method comprising:
    receiving, at an issuer server system, an electronic authorization request message from an acquirer server system forwarded from a commercial payment processing network server system, the authorization request message containing a credit transaction request, specific details of a requested purchase including: each product or type of product included in the requested purchase, and identification of a food stamp recipient;
    associating, at the issuer server system, the authorization request message with a first benefits account;
    comparing, at the issuer server system, the type of product included in the requested purchase with any restrictions placed on the first benefits account;
    comparing, at the issuer server system, a total cost of the requested purchase to a balance on the first benefits account;
    declining the transaction When the type of product included in the requested purchase is restricted by the first benefits account or when the total cost of the requested purchase exceeds the balance on the first benefits account;
    transmitting, from the issuer server system via a payment processing server system, an acquirer server system, and a merchant server system, an electronic transaction-declined message, the transaction-declined message including indicia of a reason for declining the credit transaction and required adjustments of a product or a type of product included in the credit transaction for conditional approval of the credit transaction;
    receiving a transaction adjustment message fulfilling the required adjustments for conditional approval of the credit transaction;
    resuming and approving the credit transaction;
    debiting the first benefits account at the issuer server system, and
    transmitting an electronic authorization message when the credit transaction is approved.

7. A method of processing a credit transaction as a debit payment, the method comprising:
    receiving, at an issuer server system, an electronic authorization request message, the authorization request message containing a credit transaction request, specific details of a requested purchase including:
    each product or type of product included in the requested purchase, and identification of a food stamp recipient;
    associating the authorization request message with a first benefits account;
    comparing, at the issuer server system, the type of product included in the requested purchase with any restrictions placed on the first benefits account; comparing, at the issuer server system, a total cost of the requested purchase to a balance on the first benefits account;

associating the authorization request message with a second benefits account; comparing, at the issuer server system, the type of product included in the requested purchase with any restrictions placed on the second benefits account;

comparing, at the issuer server system, a total cost of the requested purchase to a balance on the second benefits account;

declining the transaction when the type of product included in the requested purchase is restricted by the first or second benefits account or when the total cost of the requested purchase exceeds the balance on the first or second benefits account;

transmitting, from the issuer server system via a payment processing server system, an acquirer server system, and a merchant server system, an electronic transaction-declined message, the transaction-declined message including indicia of a reason for declining the credit transaction and required adjustments of a product or a type of product included in the credit transaction for conditional approval of the credit transaction;

receiving a transaction adjustment message fulfilling the required adjustments for conditional a royal of the credit transaction;

resuming and approving the credit transaction;

debiting the first benefits account at the issuer server system, and transmitting an electronic authorization message when the credit transaction is approved.

8. A electronic financial network system, comprising:

a memory; and a processor disposed in communication with the memory and configured to issue processing instructions stored in the memory to:

receive, at an issuer server system, an electronic authorization request message, the authorization request message containing a credit transaction request, specific details of a requested purchase including: each product or type of product included in the requested purchase, and identification of a food stamp recipient;

associate the authorization request message with a first benefits account;

compare, at the issuer server system, the type of product included in the requested purchase with any restrictions placed on the first benefits account;

compare, at the issuer server system, a total cost of the requested purchase to a balance on the first benefits account;

decline the transaction when the type of product included in the requested purchase is restricted by the first benefits account or when the total cost of the requested purchase exceeds the balance on the first benefits account;

transmit, from the issuer server system via a payment processing server system, an acquirer server system, and a merchant server system, an electronic transaction-declined message, the transaction-declined message including indicia of a reason for declining the credit transaction and required adjustments of a product or a type of product included in the credit transaction for conditional approval of the credit transaction;

receive a transaction adjustment message fulfilling the required adjustments for conditional approval of the credit transaction;

resume and approving the credit transaction;

debit the first benefits account at the issuer server system, and transmitting an electronic authorization message when the credit transaction is approved.

9. A processor-readable tangible medium storing processor-issuable financial transaction instructions to:

receive, at an issuer server system, an electronic authorization request message, the authorization request message containing a credit transaction request, specific details of a requested purchase including: each product or type of product included in the requested purchase, and identification of a food stamp recipient;

associate the authorization request message with a first benefits account;

compare, at the issuer server system, the type of product included in the requested purchase with any restrictions placed on the first benefits account;

compare, at the issuer server system, a total cost of the requested purchase to a balance on the first benefits account;

decline the transaction when the type of product included in the requested purchase is restricted by the first benefits account or when the total cost of the requested purchase exceeds the balance on the first benefits account;

transmit, from the issuer server system via a payment processing server system, an acquirer server system, and a merchant server system, an electronic transaction-declined message, the transaction-declined message including indicia of a reason for declining the credit transaction and required adjustments of a product or a type of product included in the credit transaction for conditional approval of the credit transaction;

receive a transaction adjustment message fulfilling the required adjustments for conditional approval of the credit transaction;

resume and approving the credit transaction;

debit the first benefits account at the issuer server system, and transmitting an electronic authorization message when the credit transaction is approved.

* * * * *